(No Model.)
S. H. WHEELER.
SHAFT BEARING.
No. 527,641. Patented Oct. 16, 1894.
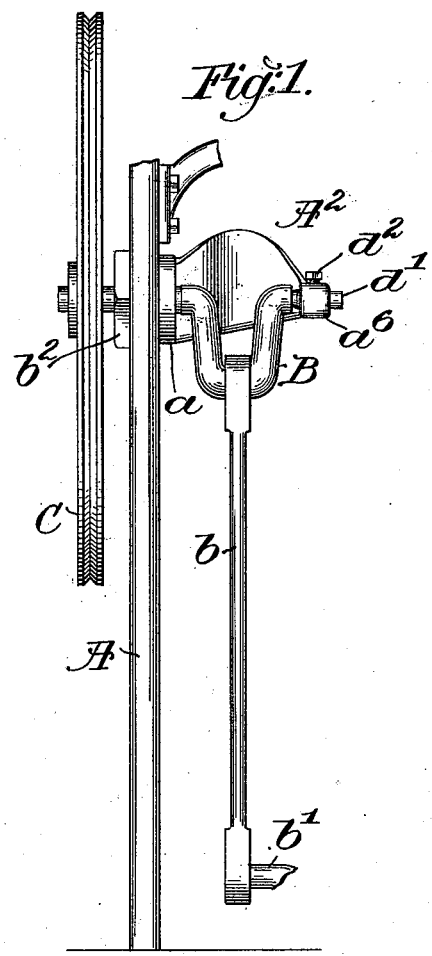
Fig. 1.
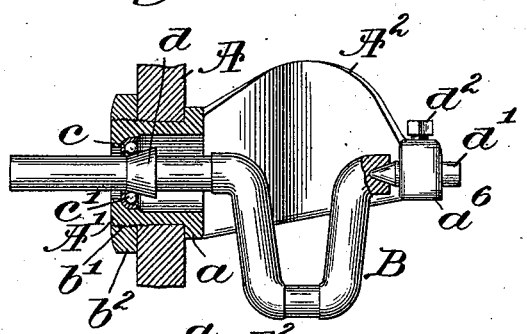
Fig. 2.
Fig. 3.
Witnesses.
Fred S. Greenleaf.
Thomas J. Drummond.
Inventor.
Samuel H. Wheeler
by Crosby & Gregory
attys.
THE NORRIS PETERS CO., PHOTO-LITHO., WASHINGTON, D. C.

UNITED STATES PATENT OFFICE.

SAMUEL H. WHEELER, OF CHICAGO, ILLINOIS, ASSIGNOR TO THE WHEELER & WILSON MANUFACTURING COMPANY, OF BRIDGEPORT, CONNECTICUT.

SHAFT-BEARING.

SPECIFICATION forming part of Letters Patent No. 527,641, dated October 16, 1894.

Application filed February 23, 1894. Serial No. 501,276. (No model.)

*To all whom it may concern:*

Be it known that I, SAMUEL H. WHEELER, of Chicago, county of Cook, State of Illinois, have invented an Improvement in Shaft-Bearings, of which the following description, in connection with the accompanying drawings, is a specification, like letters on the drawings representing like parts.

In the use of sewing and other machines run by foot power and at intervals, especially when the bearings are oiled, the oil, if the machine is not used steadily, coagulates by evaporation and thickens by taking up portions of dust, and when the machine is again started the shaft sticks in its bearings.

It frequently happens in the use of sewing machines where the power shaft runs in oiled bearings that oil gets upon the dress of the operator, and many contrivances have been made to shield the dress of the operator, thus adding to the cost of the stand.

I have aimed to produce a bearing in which oil need not be used, so that the shaft may be run at any time with the same degree of freedom; and I have devised such bearings for the shaft that any lost motion due to wear may be readily compensated for, thus insuring the uniform, steady rotation of the wheel carried by the shaft, which would not be the case if the shaft should become loose in the bearings.

In accordance with my invention, the crank or other shaft is supported in a yoke provided with bearings for the opposite ends of said shaft, which yoke is adapted to be attached to the frame-work of a sewing or other machine table; the said shaft near one end being provided with a conical projection, the inclined surface of which bears against a series of balls or rolls contained in one of the bearings of said yoke, and the other end of said shaft being supported by a screw or pivot in the opposite end of the yoke.

Figure 1 represents a part of the framework of a table or stand of, it may be, a sewing or other machine with my invention added thereto. Fig. 2 is an enlarged view partially in section showing the shaft with its support, and Fig. 3 is a modification.

In the drawings let A represent part of the frame-work of a sewing-machine or other table or article, said frame-work being of any usual or suitable shape; and B is a shaft shown as of crank form, the crank being embraced by a crank rod or pitman $b$, connected at its opposite end with a suitable treadle $b'$, but partially shown; and C is a driving wheel secured to said shaft and adapted to rotate in unison therewith. The said frame A has a suitable hole, shown in Fig. 2, which receives the hollow hub-like end $A'$ of a strong yoke $A^2$, said yoke having, as shown, a shoulder $a$ to bear against the inner side of the frame A, the hub being screw-threaded at $b'$ to receive the nut $b^2$ which serves to clamp said yoke firmly in proper position upon the framework. The hollow hub A has within it a track against which may run a series of rolls or balls $c'$, said track being preferably made as an independent cup-shaped shell of steel, as represented at $c$, but said rolls might run directly upon a shoulder or track $f$ of the collar, as represented in Fig. 3, where the cup-shaped shell is omitted.

The shaft B, herein shown as a crank, has attached to or forming part of it a cone $d$, said cone being kept seated on said balls $c'$ by or through the adjustment of the bearing for the opposite end of said shaft.

In the form in which I have herein illustrated my invention the bearing for that end of the shaft farthest from the cone is provided with a pit to receive the conical pointed end of a screw or pivot $d'$, made adjustable in the outer end $a^6$ of the yoke $A^2$, said adjustment being effected when the screw $d^2$ has been loosened. The pivot screw $d'$ constituting the bearing acts by its point against the shaft and keeps the face of the cone snugly against the balls $c'$.

My invention, while applicable to any crank shaft, is not limited to the exact shape shown for the cone, or for the shell-like case to serve as a track or support for the balls, nor is my invention limited always to the use at the end of the shaft farthest from the cone of exactly the bearing represented, so long as the bearing is made adjustable.

It is obvious that with my invention should the bearings become worn or impaired it will be necessary only to remove the yoke and shaft and replace them by new ones.

Having described my invention, what I claim as new, and desire to secure by Letters Patent, is—

1. The combination with a suitable frame-work, of an attachable yoke provided at one end with a hollow hub-like bearing adapted to be rigidly secured to said frame-work and provided with a track, a rotary shaft extending through said hub-like bearing at one end, a conical projection on said shaft arranged and operating within said hollow hub-like bearing, a series of balls interposed between said track and conical projection, and a suitable bearing in the other end of said yoke for the other end of the shaft, substantially as described.

2. The combination with a suitable frame-work, of an attachable yoke provided at one end with a hollow hub-like bearing adapted to be applied to and rigidly secured in said frame-work and provided with the independent cup-shaped track, a rotary shaft extending through said hub-like bearing at one end, the conical projection on said shaft arranged and operating within said hub-like bearing, a series of balls interposed between the independent cup-shaped track and conical projection, and the adjustable bearing in the other end of said yoke for the other end of the shaft, substantially as described.

In testimony whereof I have signed my name to this specification in the presence of two subscribing witnesses.

SAMUEL H. WHEELER.

Witnesses:
ISAAC HOLDEN,
A. E. PORTER.